United States Patent
Makki et al.

(10) Patent No.: US 8,775,011 B2
(45) Date of Patent: Jul. 8, 2014

(54) DISTINGUISHING BETWEEN EGR VALVE AND OXYGEN SENSOR DEGRADATION

(75) Inventors: Imad Hassan Makki, Dearborn Heights, MI (US); James Michael Kerns, Trenton, MI (US); Timothy Joseph Clark, Livonia, MI (US); Robert Roy Jentz, Westland, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 635 days.

(21) Appl. No.: 13/089,026

(22) Filed: Apr. 18, 2011

(65) Prior Publication Data

US 2012/0265396 A1    Oct. 18, 2012

(51) Int. Cl.
*G01M 17/00* (2006.01)
*B60T 8/88* (2006.01)
*B60T 13/52* (2006.01)
*B60T 17/02* (2006.01)

(52) U.S. Cl.
CPC ............... *B60T 8/885* (2013.01); *B60T 13/52* (2013.01); *B60T 17/02* (2013.01)
USPC ...................... 701/30.5; 73/114.79

(58) Field of Classification Search
CPC ... B60T 8/885; B60T 2270/413; B60T 13/52; B60T 17/02; B60G 17/01908
USPC ............ 701/104, 103, 109, 107, 30.5, 112, 701/32.4; 252/188.25; 123/3, 690, 677, 123/481, 678, 399, 339.15, 479, 568.16, 123/339.24; 60/277; 73/118.02, 114.79, 73/114.73

See application file for complete search history.

(56) References Cited

U.S. PATENT DOCUMENTS

| | | | |
|---|---|---|---|
| 6,434,476 B1 | 8/2002 | Zagone | |
| 6,739,177 B2 | 5/2004 | Sato et al. | |
| 6,925,804 B2 | 8/2005 | Longnecker et al. | |
| 6,945,222 B1 * | 9/2005 | Kluzner et al. | 123/339.15 |
| 7,100,585 B2 | 9/2006 | Bourret et al. | |
| 7,204,132 B2 * | 4/2007 | Reed et al. | 73/114.79 |
| 7,318,409 B2 * | 1/2008 | Cullen | 123/399 |
| 8,375,701 B2 * | 2/2013 | Lupescu et al. | 60/279 |
| 2006/0243040 A1 * | 11/2006 | Reed et al. | 73/119 R |
| 2008/0262703 A1 * | 10/2008 | Kawase et al. | 701/107 |
| 2008/0262704 A1 * | 10/2008 | Kawase et al. | 701/109 |
| 2008/0319635 A1 * | 12/2008 | Ostberg et al. | 701/103 |
| 2010/0294253 A1 | 11/2010 | Kawase et al. | |
| 2012/0012782 A1 * | 1/2012 | Scotto et al. | 252/188.25 |
| 2012/0012783 A1 * | 1/2012 | Scotto | 252/188.25 |
| 2012/0245823 A1 * | 9/2012 | Yoshioka | 701/104 |

\* cited by examiner

*Primary Examiner* — Behrang Badii
(74) *Attorney, Agent, or Firm* — Julia Voutyras; Alleman Hall McCoy Russell & Tuttle LLP

(57) ABSTRACT

A diagnostic method for an engine having a valve for controlling dilution of intake air. The method comprises, during engine fueling, indicating a degradation of the valve when the valve is commanded closed but sensor output corresponds to an oxygen level below that of air. The method further comprises, absent engine fueling, indicating degradation of the sensor when the valve is commanded closed but the sensor output corresponds to an oxygen level below that of air.

8 Claims, 3 Drawing Sheets

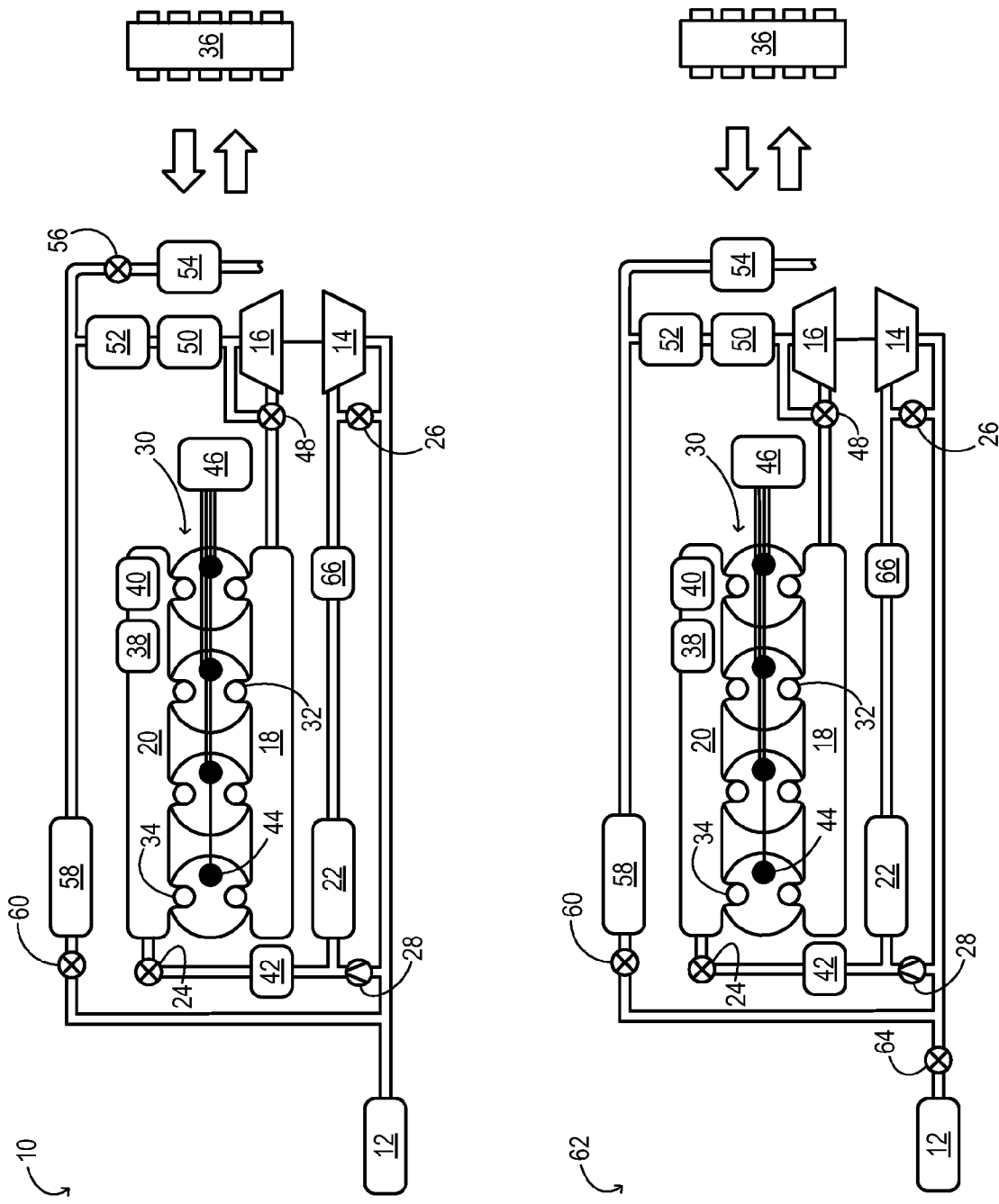

DISTINGUISHING BETWEEN EGR VALVE AND OXYGEN SENSOR DEGRADATION

TECHNICAL FIELD

This application relates to the field of motor vehicle engineering, and more particularly, to diagnosis of an exhaust-gas regeneration (EGR) system of a motor vehicle.

BACKGROUND AND SUMMARY

Exhaust-gas recirculation (EGR) helps to reduce $NO_x$ emissions from an engine by controlling peak combustion temperatures. EGR works by diluting the intake air charge with exhaust gas, thereby reducing its oxygen content. When diluted air is used in place of ordinary air to support combustion in the engine, lower peak combustion temperatures result.

EGR can also improve fuel economy in gasoline engines. At medium and high loads, fuel economy is improved due to knock mitigation, allowing for more efficient combustion phasing, reduced heat loss to the engine coolant, and lower exhaust temperatures, which in turn reduce the need for enrichment to cool the exhaust components. At low loads, EGR provides an additional benefit of reducing throttling losses.

In a modern EGR system, exhaust may be admitted into the intake air flow through an electronically actuated EGR valve. A motor-vehicle controller may actuate the valve in response to an output of an oxygen sensor coupled in the intake air flow. In some cases, the valve may be controlled in a closed-loop manner, such that the sensor output is regulated to a set-point value. Naturally, both the valve and the sensor are subject to degradation. In some cases, a degraded EGR system may be identified via diagnostic procedures enacted in the controller.

For example, U.S. Pat. No. 7,100,585 describes diagnosing degradation of an EGR valve based on a measurement of valve position. This approach requires a dedicated position sensor on the valve as well as a dedicated feedback channel in the controller. U.S. Patent Application Publication 2010/0294253 describes diagnosing degradation of the EGR valve by measuring a change in the intake air pressure on closing the valve. This approach may not be sensitive enough to detect a relatively small leak in the EGR valve.

Accordingly, the inventors herein have devised a sensitive and potentially cost-saving alternative method to diagnose degradation of an EGR valve using output from an oxygen sensor coupled in the intake air flow. One embodiment provides a diagnostic method for an engine having an EGR valve for controlling dilution of intake air. The method comprises, during engine fueling, indicating degradation of the valve when the valve is commanded closed but sensor output corresponds to an oxygen level below that of air. The method further comprises, absent engine fueling, indicating degradation of the sensor when the valve is commanded closed but the sensor output corresponds to an oxygen level below that of air. In this manner, sensor and EGR-valve degradation are unambiguously distinguished from one another, enabling appropriate corrective action to be taken.

The summary above is provided to introduce a selected part of this disclosure in simplified form, not to identify key or essential features. The claimed subject matter, defined by the claims, is limited neither to the content of this summary nor to implementations that address problems or disadvantages noted herein.

BRIEF DESCRIPTION OF THE DRAWINGS

FIGS. 1 and 2 shows aspects of example engine systems in accordance with embodiments of this disclosure.

DETAILED DESCRIPTION

Figure 3:
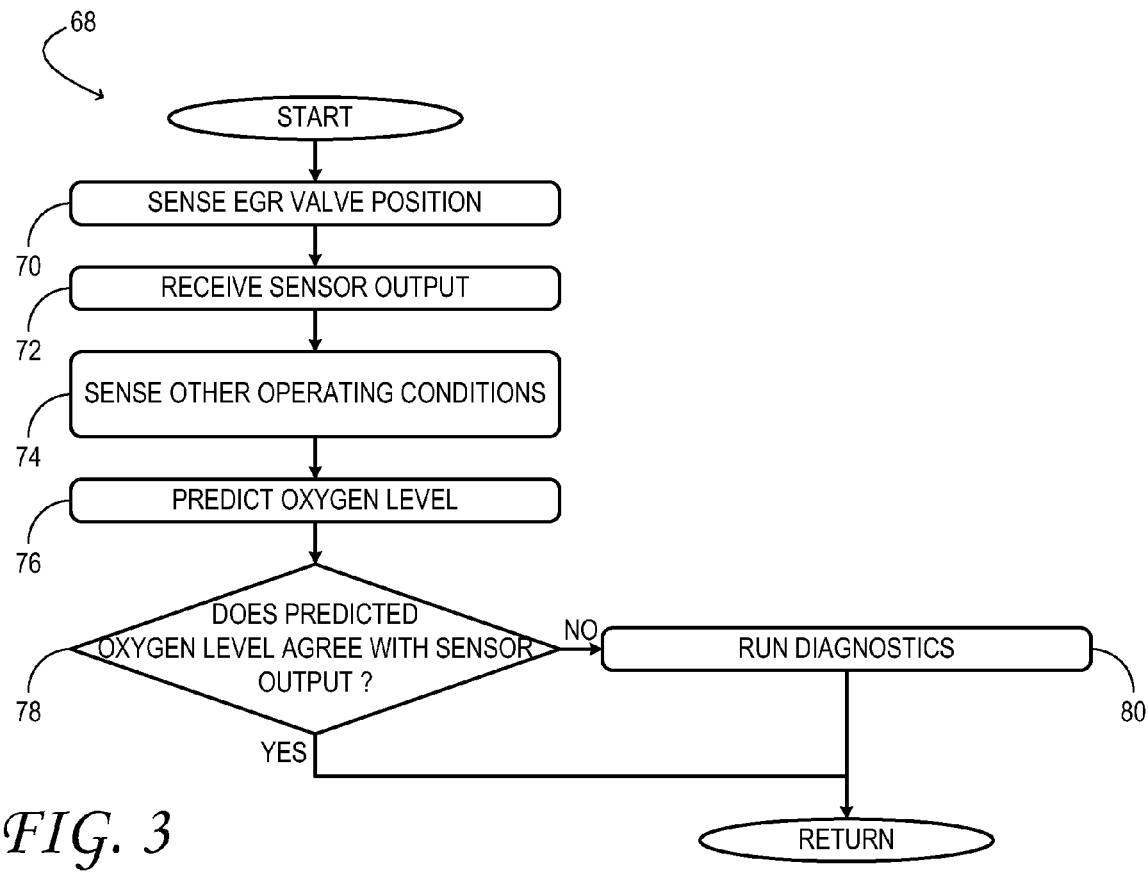
FIGS. 3, 4 and 5 illustrate aspects of example diagnostic methods for an EGR system of a motor vehicle in accordance with embodiments of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. In engine system 10, fresh air is inducted into air cleaner 12 and flows to compressor 14. The compressor may be any suitable intake-air compressor—a motor-driven or driveshaft driven supercharger compressor, for example. In engine system 10, however, the compressor is a turbocharger compressor mechanically coupled to turbine 16, the turbine driven by expanding engine exhaust from exhaust manifold 18. In one embodiment, the compressor and turbine may be coupled within a twin scroll turbocharger. In another embodiment, the turbocharger may be a variable geometry turbocharger (VGT), in which turbine geometry is actively varied as a function of engine speed.

In engine system 10, compressor 14 is coupled fluidically to intake manifold 20 via charge-air cooler 22 and throttle valve 24. Accordingly, pressurized air from the compressor flows through the charge-air cooler and the throttle valve en route to the intake manifold. The charge-air cooler may be any suitable heat exchanger configured to cool the intake air charge for desired combustion and emissions-control performance. As shown in FIG. 1, compressor by-pass valve 26 is coupled between the inlet and the outlet of the compressor. The compressor by-pass valve may be a normally closed valve configured to open at the command of an electronic control system (vide infra) in order to relieve excess boost pressure under selected operating conditions. For example, the compressor by-pass valve may be opened during conditions of decreasing engine speed to avert compressor surge. When the compressor by-pass valve is opened, uncompressed, fresh air may flow to throttle valve 24 through check valve 28. Check valve 28 enables fresh air bypass of most of the EGR-diluted air charge upstream of the throttle valve. This feature may reduce the impact of residual EGR-diluted air in the engine system during tip out.

In engine system 10, exhaust manifold 18 and intake manifold 20 are coupled to a series of cylinders 30 through a series of exhaust valves 32 and intake valves 34, respectively. In one embodiment, each of the exhaust and intake valves may be electronically actuated. In another embodiment, each of the exhaust and intake valves may be cam actuated. Whether electronically actuated or cam actuated, the timing of exhaust and intake valve opening and closure may be adjusted as needed for desired combustion and emissions-control performance.

FIG. 1 shows electronic control system 36, which may be an electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a cylinder at a time of ignition. To assess operating conditions in connection with the control functions of the engine system, the electronic control system may be operatively coupled to a plurality of sensors arranged throughout the engine system—flow sensors, temperature sensors, pedal-position sensors, pressure sensors, etc. In FIG. 1, for example, manifold air-pressure (MAP) sensor 38 and manifold air-temperature sensor (MAT) 40 are shown coupled to intake manifold 20; mass air-flow (MAF) sensor 42 is coupled upstream of throttle valve 24. Various other sensors may be provided as well, in this and other embodiments.

Cylinders 30 may be supplied one or more of a variety of fuels: gasoline, alcohols, diesel, biodiesel, compressed natural gas, etc. Fuel may be supplied to the cylinders via direct injection, port injection, throttle-body injection, or any combination thereof. In engine system 10, combustion is initiated via spark ignition. Accordingly, the engine system includes a series of spark plugs 44 configured to receive timed voltage pulses from electronic ignition system 46. In other embodiments, combustion may be initiated via spark ignition and/or compression ignition in any variant.

As noted above, exhaust from exhaust manifold 18 flows to turbine 16 to drive the turbine. When reduced turbine torque is desired, some exhaust may be directed instead through waste gate 48, by-passing the turbine. The combined flow from the turbine and the waste gate then flows through exhaust-aftertreatment devices 50 and 52. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap $NO_x$ from the exhaust flow when the exhaust flow is lean, and to reduce the trapped $NO_x$ when the exhaust flow is rich. In other examples, an exhaust-aftertreatment catalyst may be configured to disproportionate $NO_x$ or to selectively reduce $NO_x$ with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize soot particles in the exhaust flow.

Continuing in FIG. 1, all or part of the treated exhaust from the exhaust aftertreatment devices may be released into the ambient via silencer 54. In engine system 10, the treated exhaust flows to the silencer via exhaust back-pressure valve 56. The exhaust back-pressure valve may be kept fully open under normal operating conditions, but commanded to partially close at low engine loads, as further described hereinafter.

Depending on operating conditions, some treated exhaust may be diverted through EGR cooler 58. The exhaust may be diverted by opening EGR valve 60 coupled in series with the EGR cooler. Accordingly, the position of the EGR valve affects the dilution of the intake air. The EGR cooler may be any suitable heat exchanger configured to cool the exhaust flow to temperatures suitable for mixing into the intake air charge. From EGR cooler 58, the cooled exhaust gas flows to EGR valve 60; from the EGR valve, it flows through to compressor 14. In the illustrated LP EGR configuration, the EGR valve receives exhaust from downstream of exhaust turbine 16, and the intake air is diluted with such exhaust upstream of compressor 14. The rotation of the compressor, in addition to the relatively long LP EGR flow path in engine system 10, provides excellent homogenization of the exhaust gas into the intake air charge. Further, the disposition of EGR take-off and mixing points provides effective cooling of the exhaust gas; as shown in FIG. 1, the recirculated exhaust traverses exhaust-aftertreatment devices 50 and 52, EGR cooler 58, as well as charge-air cooler 22. Nevertheless, numerous other EGR configurations are contemplated as well, including those in which high-pressure exhaust is drawn from a locus upstream of turbine 16 and mixed into the intake air downstream of compressor 14.

In some embodiments, throttle valve 24, compressor by-pass valve 26, waste gate 48, exhaust back-pressure valve 56, and/or EGR valve 60 may be electronically controlled and configured to close and open at the command of electronic control system 36. Further, one or more of these valves may be continuously adjustable. The electronic control system may be operatively coupled to each of the electronically controlled valves and configured to command their opening, closure, and/or adjustment as needed to enact any of the control functions described herein.

Exhaust-back pressure valve 56 may be partially closed to maintain adequate flow potential in the external EGR loop. When the exhaust back-pressure valve is partially closed, exhaust pressure builds at the LP EGR take-off point, thereby increasing the external EGR flow potential. Partially closing the exhaust back-pressure valve may also increase the internal EGR rate by increasing the exhaust pressure in exhaust manifold 18.

FIG. 2 schematically shows aspects of another example engine system 62 in one embodiment. Engine system 62 lacks exhaust backpressure valve 56, but includes clean-air air throttle valve 64 coupled downstream of air cleaner 12. The clean-air throttle valve may be an electronically controlled valve operatively coupled to electronic control system 36. The clean-air throttle valve may be kept fully open under normal operating conditions, but partially closed at low engine loads to maintain adequate flow potential in the external EGR loop. When the clean-air throttle valve is partially closed, a partial vacuum develops downstream of the clean-air throttle valve, thereby increasing the external EGR flow potential. In other embodiments fully consistent with this disclosure, the engine system may include both an exhaust back-pressure valve and a clean-air throttle valve. In still other embodiments, the engine system may include neither.

FIGS. 1 and 2 also show intake-air oxygen (IAO2) sensor 66 coupled in the intake air flow upstream of charge-air cooler 22. The IAO2 sensor is operatively coupled to electronic control system 36 and configured to provide an output responsive to the oxygen level (i.e., the partial pressure of $O_2$) in the intake air flow. Such output may include a voltage or pumping current. In other words, the IAO2 sensor may be configured such that the output increases monotonically (linearly in some cases) with increasing partial pressure of $O_2$. In one embodiment, the IAO2 sensor may be a UEGO sensor. Accordingly, the electronic control system may adjust the position of EGR valve 60 in response to the output of the IAO2 sensor to exert closed-loop control over the intake-air oxygen level.

Naturally, EGR valve 60 and IAO2 sensor 66 may each be subject to degradation. In principle, the output of the IAO2 sensor may be useful in diagnosing a degraded EGR valve: the intake-air oxygen level can be predicted based on the commanded EGR valve position together with sensed engine-operating conditions. The predicted value may then be compared to the output of the IAO2 sensor. A lower-than-predicted oxygen level could indicate a leaking EGR valve. However, this method of diagnosis is ambiguous, because the lower-than-predicted oxygen level could also result from a degraded IAO2 sensor.

To address this issue while providing still other advantages, this disclosure describes various diagnostic methods. The methods are enabled by and described with continued reference to the above configurations. It will be understood, however, that the methods here described, and others fully within the scope of this disclosure, may be enabled by other configurations as well. The methods may be entered upon any time the engine system is operating, and may be executed repeatedly. Naturally, each execution of a method may change the entry conditions for a subsequent execution and thereby invoke a complex decision-making logic. Such logic is fully contemplated in this disclosure.

Further, some of the process steps described and/or illustrated herein may, in some embodiments, be omitted without departing from the scope of this disclosure. The indicated sequence of the process steps may not always be required to achieve the intended results, but is provided for ease of illustration and description. One or more of the illustrated actions, functions, or operations may be performed repeatedly, depending on the particular strategy being used.

The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, pursuant to the decision-making events. The control and estimation disclosed herein may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

FIG. 3 illustrates aspects of an example diagnostic method 68 for an EGR system of a motor vehicle. At 70 EGR valve position—e.g., lift or opening amount—is sensed. In one embodiment, the position of the valve may be sensed directly, via a position sensor coupled to the valve. In other embodiments, the position may be indirectly or inferentially sensed. For example, sensing the position may comprise reading the position commanded by the electronic control system. At 72 the output of an IAO2 sensor is received in the electronic control system. At 74 other operating conditions of the engine system are sensed. Such other conditions may include exhaust backpressure valve position, clean air throttle valve position, intake throttle valve position, engine speed, engine load, intake-air amount, fuel-injection amount, manifold air pressure, and/or manifold air temperature, as examples.

At 76 the intake air oxygen level is predicted based on the EGR valve position and the various other operating conditions. At 78 it is determined whether the predicted oxygen level agrees with the output of the IAO2 sensor. If the predicted oxygen level agrees with the IAO2 sensor output, then the method returns. However, if the predicted oxygen level does not agree with the IAO2 sensor output, then the method advances to 80, where suitable EGR valve and/or sensor diagnostics are run. In one embodiment, such diagnostics may be triggered when the predicted oxygen level does not agree with the sensor output. From 80 the method returns.

Figure 4:
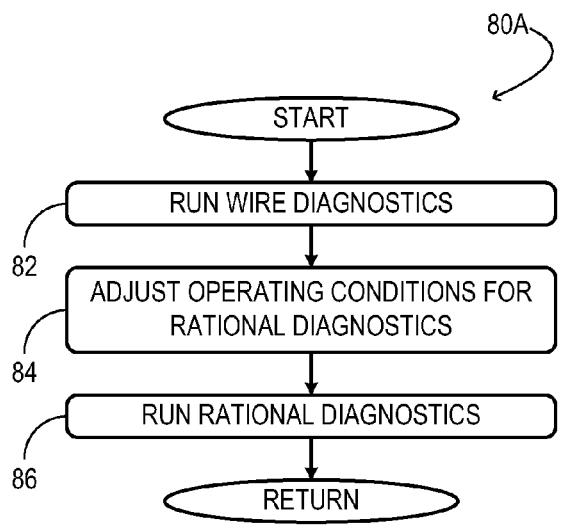

FIG. 4 illustrates aspects of another example diagnostic method 80A for an EGR system of a motor vehicle. Method 80A may be enacted at 80 of method 68, in one non-limiting example. At 82 wire diagnostics on the IAO2 sensor are run. This action may include determining whether the sensor output is shorted—e.g., to ground or a power supply rail—or whether the output is at open circuit. At 84 one or more operations of the engine are adjusted in order to enable a subsequent rational diagnostics routine to be run. In one embodiment, this action may include commanding closure of the EGR valve. In another embodiment, it may include suspending fueling of the engine—e.g., entering a deceleration fuel shut off (DFSO) mode. At 86 the rational diagnostics routine is run. In one embodiment, execution of 86 or any subsequence thereof may begin after a suitable delay. In this manner, the IAO2 sensor output may be received after a predetermined period of time after the engine operations are adjusted, allowing time for the intake-air oxygen levels to adjust to the EGR and/or fuel cut off. From 86 the method returns.

Figure 5:
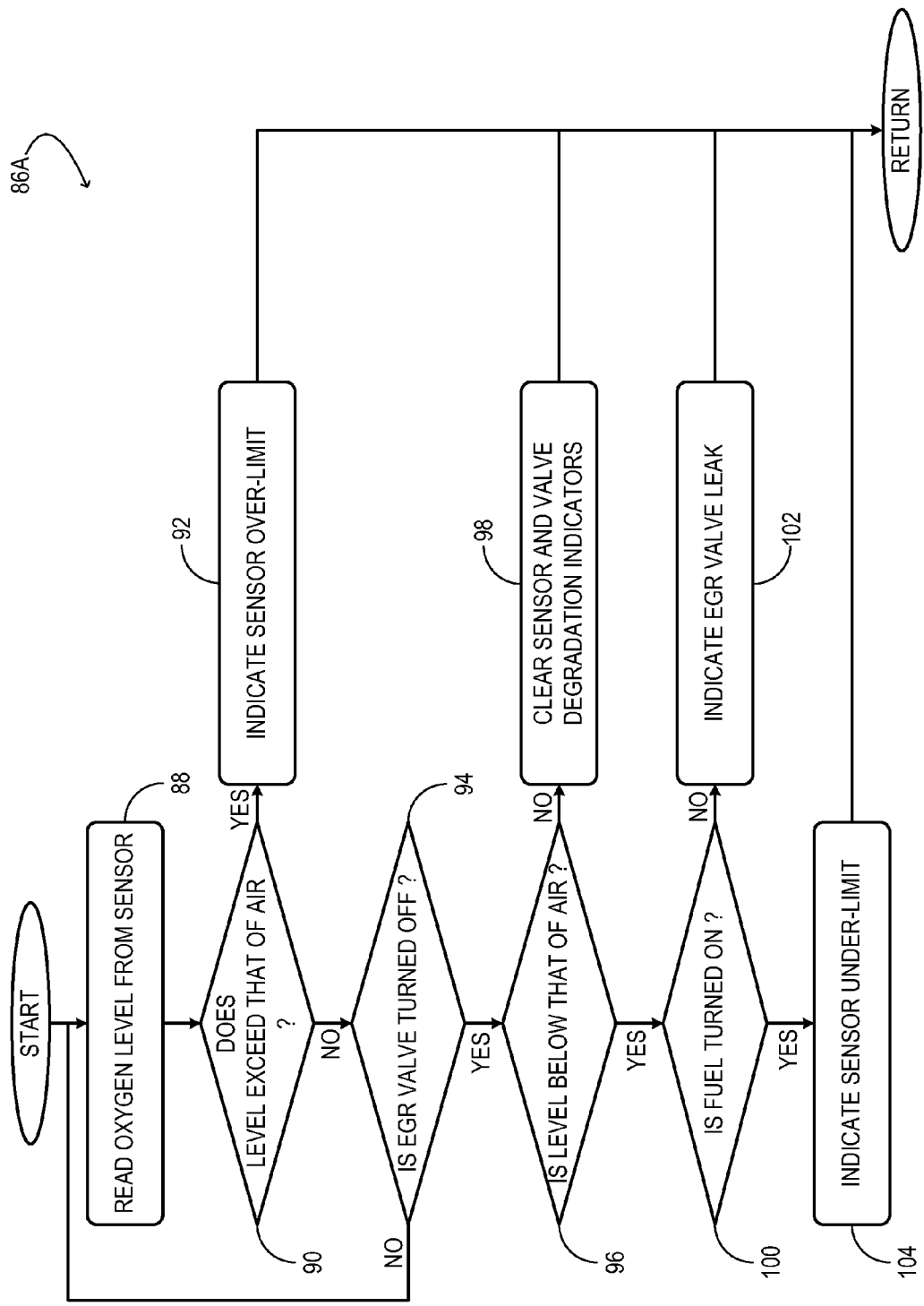

FIG. 5 illustrates aspects of another example diagnostic method 86A for an EGR system of a motor vehicle. Method 86A may be enacted at 86 of method 80A, in one non-limiting example. At 88 the intake-air oxygen level is read from the IAO2 sensor. In some embodiments, this action may include applying a suitable current or voltage bias to the electrodes of the sensor. At 90 it is determined whether the oxygen level read in this manner exceeds that of air (e.g., fresh air, ambient air). If the oxygen level does exceed that of air, then the method advances to 92, where an over-limit IAO2 sensor output is indicated. However, if the oxygen level does exceed that of air, then the method advances to 94, where it is determined whether the EGR valve is turned off—i.e., commanded to be closed. This determination may be made by interrogating an appropriate data structure stored in the electronic control system. If the EGR valve is not turned off, then the method returns to 88. However, if the EGR valve is turned off, then the method advances to 96. At 96 it is determined whether the oxygen level is below that of air. In one embodiment, this action may include determining whether the oxygen level is below that of air by at least a predetermined, absolute, or relative threshold amount. If the oxygen level is not below that of air, then the method advances to 98, where IAO2 sensor and EGR valve degradation indicators (if any) are cleared. However, if the level is below that of air, then the method advances to 100. At 100 it is determined whether the fuel is turned on—i.e., whether fuel injection is active in the engine. If the fuel is turned on, then the method advances to 102, where an EGR-valve leak is indicated. Accordingly, degradation of the valve is indicated during engine fueling, when the valve is commanded closed but the output of the IAO2 sensor corresponds to an oxygen level below that of air. However, if the fuel is not turned on—if the engine system is in DFSO mode, for example—then the method advances to 104, where an under-limit IAO2 sensor output is indicated. Accordingly, under-limit degradation of the IAO2 sensor output is indicated absent engine fueling, when the valve is commanded closed but the sensor output corresponds to an oxygen level below that of air.

In some embodiments, indicators of various forms of degradation may be set and/or cleared in an on-board diagnostic system of a motor vehicle in which the engine is installed. This action may include setting and/or clearing dedicated MIL codes, for example. In scenarios in which a MIL code is set, an indicator light may be illuminated or an audible alarm sounded. Further, one or more operations of the motor vehicle may be adjusted in view of the particular kind of degradation diagnosed. In one example, the electronic control system may switch from closed-loop to open-loop control of the EGR valve when degradation of the IAO2 sensor output is detected. When a leaking EGR valve is detected, the electronic control system may attempt to enhance combustion stability at low engine speeds—by decreasing spark retard, for example. From 92, 98, 102, or 104, the method returns.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A diagnostic method for an engine having a valve for controlling dilution of intake air, the method comprising:
   supplying the intake air to an intake manifold of the engine, an oxygen sensor coupled upstream of the intake manifold providing an output;
   indicating over-limit degradation of the sensor when sensor output corresponds to an oxygen level above that of air;
   during engine fueling, indicating degradation of the valve when the valve is commanded closed but the sensor output corresponds to an oxygen level below that of air; and
   absent engine fueling, indicating under-limit degradation of the sensor when the valve is commanded closed but the sensor output corresponds to an oxygen level below that of air.

2. The method of claim 1 wherein the valve receives exhaust from downstream of an exhaust turbine mechanically coupled to a compressor, and wherein the intake air is diluted with such exhaust upstream of the compressor.

3. The method of claim 1 wherein indicating the valve or sensor degradation includes indicating in an on-board diagnostic system of a motor vehicle in which the engine is installed.

4. A diagnostic method for an engine having a valve for controlling dilution of intake air, comprising:
   supplying the intake air to an intake manifold of the engine, an oxygen sensor coupled upstream of the intake manifold providing an output;
   adjusting an operation of the engine;
   receiving sensor output after a predetermined period of time after the operation is adjusted;
   indicating over-limit degradation of the sensor when the sensor output corresponds to an oxygen level above that of air;
   during engine fueling, indicating degradation of the valve when the valve is commanded closed but the sensor output corresponds to an oxygen level below that of air; and
   absent engine fueling, indicating under-limit degradation of the sensor when the valve is commanded closed but the sensor output corresponds to an oxygen level below that of air.

5. The method of claim 4 wherein adjusting the operation includes commanding closure of the valve.

6. The method of claim 4 wherein adjusting the operation includes suspending fueling of the engine.

7. The method of claim 4 further comprising determining whether the sensor output is shorted or at open circuit.

8. The method of claim 4 further comprising:
   sensing operating conditions of the engine that include a position of the valve; and
   predicting the oxygen level based on the operating conditions,
   wherein said indicating is triggered when the predicted oxygen level does not agree with the sensor output.

* * * * *